Figure 1:
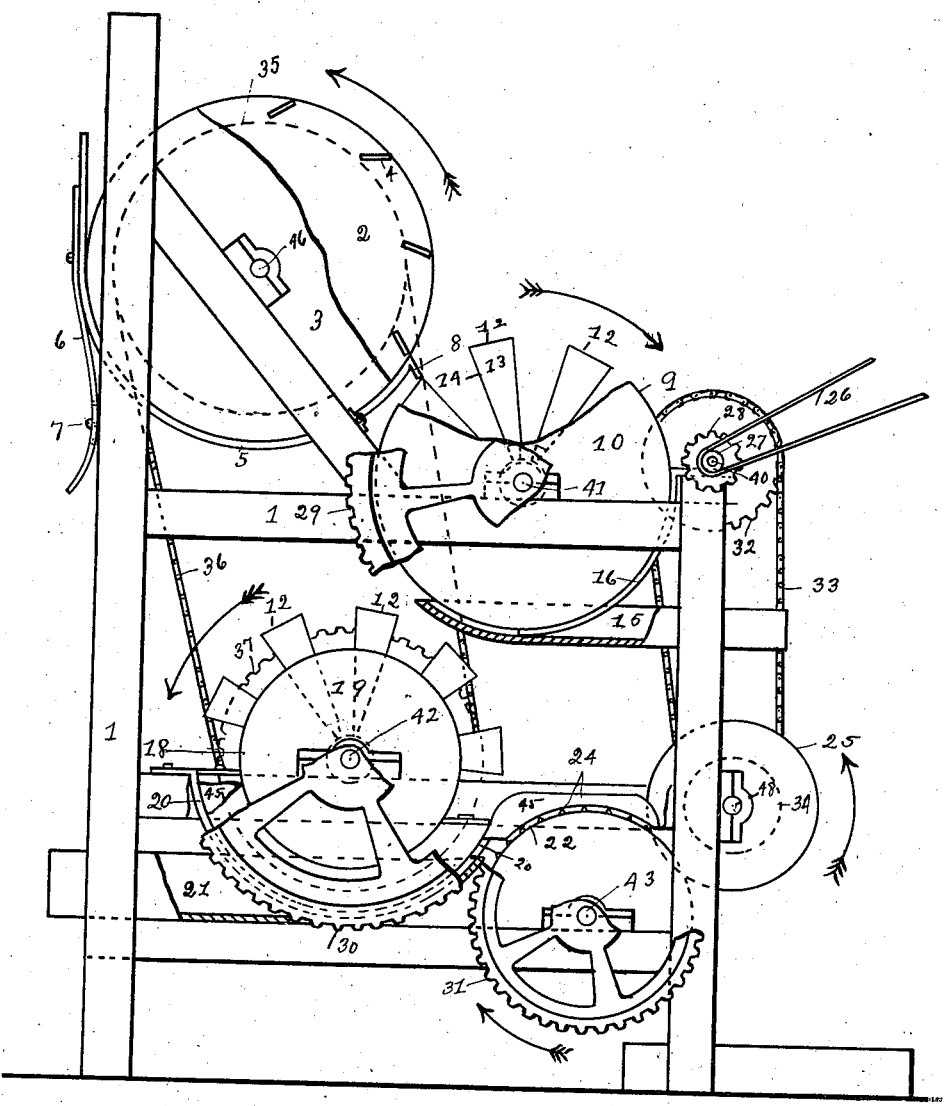

E. M. LAWRENCE.
FISH CUTTING MACHINE.
APPLICATION FILED SEPT. 20, 1911.

1,010,156.

Patented Nov. 28, 1911.
2 SHEETS—SHEET 1.

WITNESSES
Charles L. Foster
Mary C. Page

INVENTOR
Edward M. Lawrence
by Clifford Verrill Clifford
Attorney

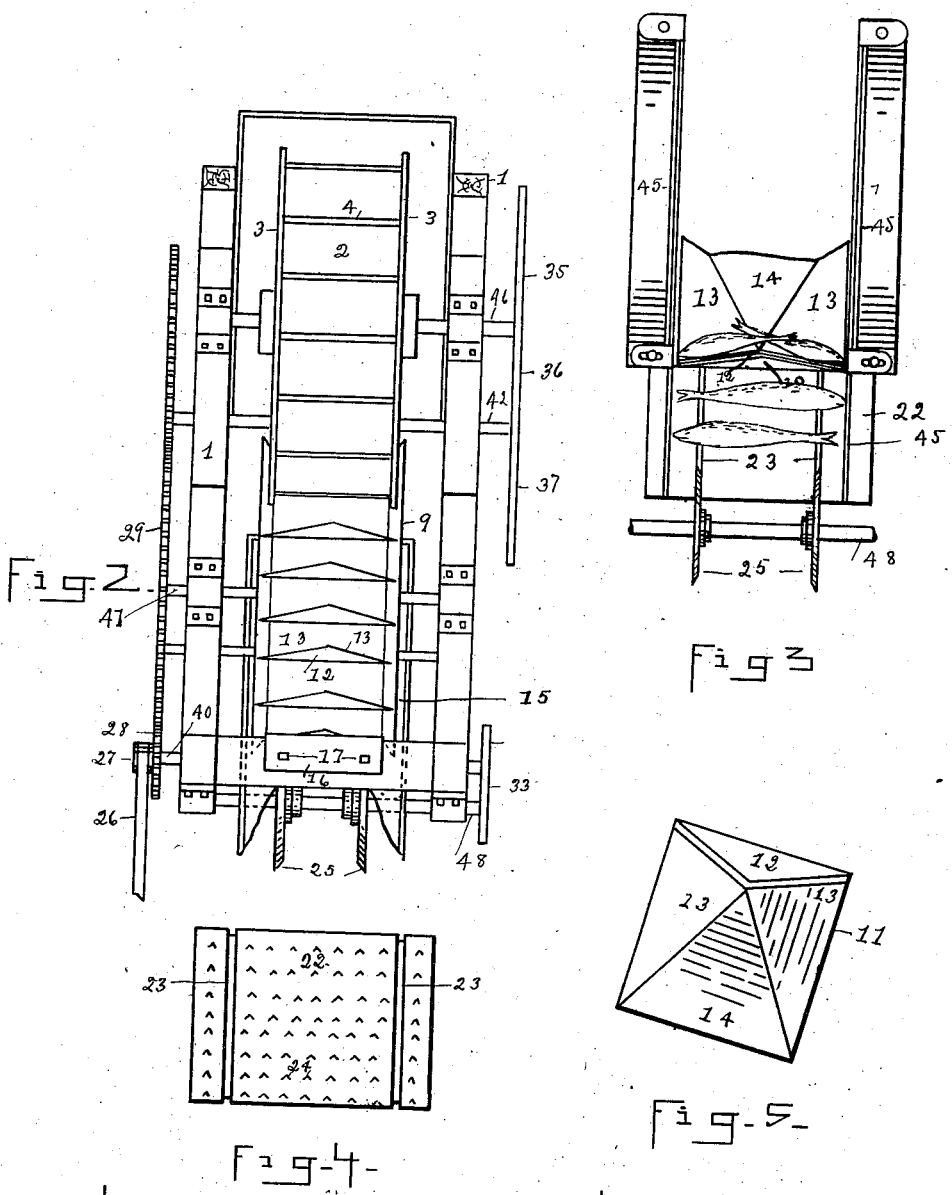

UNITED STATES PATENT OFFICE.

EDWARD M. LAWRENCE, OF LUBEC, MAINE.

FISH-CUTTING MACHINE.

1,010,156.  Specification of Letters Patent.  Patented Nov. 28, 1911.

Application filed September 20, 1911.  Serial No. 650,389.

*To all whom it may concern:*

Be it known that I, EDWARD M. LAWRENCE, a citizen of the United States, residing at Lubec, in the county of Washington and State of Maine, have invented certain new and useful Improvements in Fish-Cutting Machines, of which the following is a specification.

This invention relates to improvements in fish cutting machines and especially machines used in the sardine industry for cutting off the heads and tails of small fish.

Hitherto the heads and tails of the fish have in the main been cut off manually. Various attempts have been made to provide means for doing this work by machinery, but, on account of the variation in the size of the fish and because of the difficulty of segregating the fish and properly positioning them in the path of the cutting devices, such machines have not been very successful.

The present invention is especially designed to position the fish properly in the path of cutting devices.

In the drawing herewith accompanying and forming a part of this application, Figure 1 is a side elevation of my improved machine, some parts being broken away to show interior mechanisms; Fig. 2 is a top plan view of the same; Fig. 3 is an enlarged detail showing the mechanism which positions the fish in the path of the cutting devices; Fig. 4 is a detail plan view of the bed upon which the fish are cut; and Fig. 5 is a detail perspective view of one of the positioning devices.

Same reference characters indicate like parts in the several figures.

In said drawing 1 is the frame upon which the operating mechanisms are mounted. Secured to the frame 1 is a segregating drum wheel 2 having closed ends 3 and near the periphery inclined shelves or buckets 4 extending from end to end. The underside of the wheel is fitted with an adjustable apron 5, leaving the top open for the reception of the fish in mass. The apron 5 may be attached to a supporting arm 6 secured to the frame and adjustable thereon by means of a set screw 7. The apron terminates in a downwardly and outwardly inclined offset 8.

Secured to the frame at a point somewhat below and to one side of wheel 2 is a positioning drum wheel 9, having closed ends 10 and transversely extending radially inclined positioning devices 11. These positioning devices form the sides of fish receiving pockets into which the fish segregated in wheel 2 fall from the shelves as the wheel revolves. These positioning devices are substantially pyramidal shaped, one side 12 being placed substantially coincident with the periphery of the wheel, the sides 13 being inclined to the plane of the sides of the wheel and the side 14 being substantially radial. These positioning devices may be made of any material and may be solid or concave. They are arranged in a series extending at regulated intervals around the wheel and extend from end to end. The under side of the wheel 9 preferably runs in a tray or tank 15 filled with water, the water lessening the friction of the fish upon the positioning devices and facilitating the outward movement. On the upper side of this wheel 9 the positioning devices are exposed, but the under side of the wheel is covered by an apron 16 secured to the frame in any convenient manner, as by screw 17. This apron holds the fish in place during that part of the revolution of the wheel 9 when they would otherwise fall out of the wheel by gravity. Secured to the frame somewhat below and to one side of wheel 9 is a similar wheel 18 provided with similar positioning devices, but in this wheel the ends 19 do not extend outwardly to the periphery of the wheel, as shown in Fig. 1, to allow the fish to pass out beyond the end of the wheel. This wheel is provided with an apron 20 and its under side runs in a tray of water 21 substantially the same as wheel 9.

Positioned somewhat below and to one side of wheel 18 is a cylindrical rotary cutting bed 22, somewhat wider than wheel 18. This is provided near either end with transverse slots 23 and, extending from end to end, with a series of rows of projecting spurs 24. Rotary cutters 25 are mounted on the frame and positioned so that the cutting edges take into and travel in the slots 23 in the cutting bed 22.

In tray 21 is an adjustable gage 45 extending down on either side into the tray and adjustable laterally relative to the positioning device to accommodate fish of varying sizes.

The movable parts of the machine may be driven by the usual mechanical devices from power not shown transmitted by belt 26 to a pulley 27 set on shaft 40. On shaft 40 is a gear 28 which meshes with a gear 29 on shaft 41 set in the frame, causing wheel 9 to turn in the direction indicated by the arrow. Gear 29 meshes with a gear 30 on shaft 42 causing wheel 18 to rotate in the direction indicated by the arrow. Gear 30 meshes with gear 31 on shaft 43 causing the cutting bed to rotate in the direction indicated by the arrow. The cutters are driven by a sprocket chain 33 passing over sprocket wheels 32 and 34 on shafts 40 and 48 respectively. The segregating wheel is driven by a sprocket chain 36 passing over sprocket wheel 37 and 35 set on shafts 42 and 46 respectively.

The operation of my improved device is as follows: The fish in mass are dumped into the segregating wheel and fall upon the shield 5 at the bottom thereof. As the wheel revolves the fish are picked up, one or more, upon the shelves 4 and are carried around until they slide by gravity into positioning wheel 9. As wheel 9 revolves the fish fall against the pyramidal shaped partitions forming the pockets and are carried by gravity head foremost outwardly toward the ends of the wheel and thence become more or less perfectly positioned with their noses against the ends of the wheel. They then pass into the second positioning wheel 18 provided with similar pyramidal shaped partitions. The head part of the fish being heaviest the head end falls down on the inclined side and outwardly toward the positioning gages set in the tray underneath the wheel. In this position they are carried around until they fall by gravity out of the wheel endwise onto the cutting bed and head against the gages and thence on the bed around until they pass under the rotary cutters which sever the head and tail.

The water in the trays prevent the machine from becoming clogged with the scales and since it soon becomes slimy it lessens the frictional contact of the fish on the positioning partitions, whereby they slide more readily into position. The positioning wheel is somewhat narrower than the cutting bed so that the angle of the positioning device will always lie nearest the tail of the fish insuring that the head will always drop downwardly and outwardly toward the ends of the wheel.

Having thus described my invention and its use, I claim:

1. In a fish cutting machine, a segregating wheel, a positioning wheel comprising a series of pockets formed by radially extending transverse partitions substantially pyramidal shaped, and a cutting bed positioned to receive the fish from the positioning wheel.

2. In a fish cutting machine, a segregating wheel, a positioning wheel provided with a series of pockets formed by radially extending transverse partitions substantially pyramidal shaped, the outer ends of said partitions extending beyond the ends of the wheel, and a cutting bed adapted to receive the fish from the positioning wheel.

3. In a fish cutting machine, a segregating wheel, a series of positioning wheels adapted to deliver one into the other, each provided with a series of pockets formed by radially extending transverse partitions substantially pyramidal shaped, the last in the series having the partitions extending beyond the ends of the wheel, and a cutting bed adapted to receive the fish discharged from the last of the series.

4. In a fish cutting machine, a segregating wheel, a positioning wheel provided with a series of pockets formed by radially extending transverse partitions substantially pyramidal shaped, the apex and one side of the pyramidal partition being substantially coincident with the periphery of the wheel, and a cutting bed adapted to receive the fish discharged from the positioning wheel.

5. In a fish cutting machine, a segregating wheel, a positioning wheel provided with a series of pockets formed by substantially pyramidal shaped partitions, a water tray in which the lower extremity of the positioning wheel is submerged, and a cutting bed adapted to receive the fish discharged from the positioning wheel.

6. In a fish cutting machine, a segregating wheel, a positioning wheel provided with a series of pockets formed by radially extending transverse partitions substantially pyramidal shaped, and a cutting bed wider than the positioning wheel adapted to receive the fish as they are discharged from the positioning wheel.

7. In a fish cutting machine, a segregating wheel, a positioning wheel, a water tray in which the lower extremity of the positioning wheel is submerged, and gages secured to the inside of the tray and adjustable laterally relative thereto.

EDWARD M. LAWRENCE.

Witnesses:
 WILLIAM AVERY,
 WILLIAM F. BROWN.